A. E. GUMZ.
CARBURETER.
APPLICATION FILED JAN. 20, 1908.
1,003,101.
Patented Sept. 12, 1911.
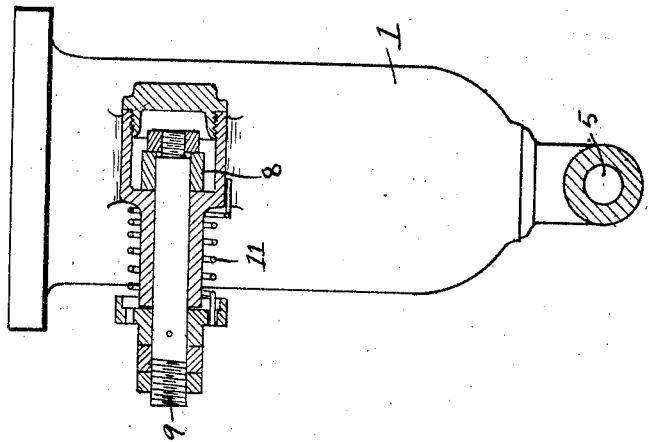
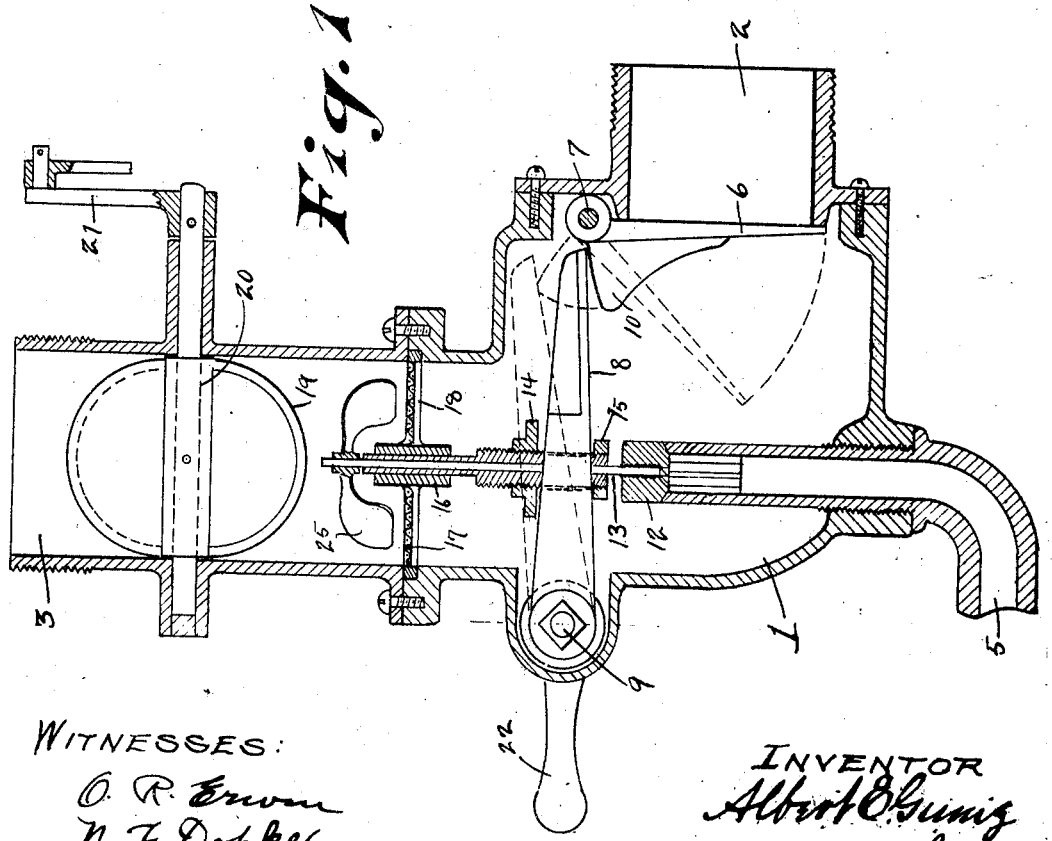
WITNESSES:
O. R. Erwin
N. F. Dopke
INVENTOR
Albert E. Gumz
By Erwin & Studer
ATTORNEYS

UNITED STATES PATENT OFFICE.

ALBERT E. GUMZ, OF MILWAUKEE, WISCONSIN.

CARBURETER.

1,003,101.  Specification of Letters Patent.  Patented Sept. 12, 1911.

Application filed January 20, 1908. Serial No. 411,564.

*To all whom it may concern:*

Be it known that I, ALBERT E. GUMZ, a citizen of the United States, residing at Milwaukee, county of Milwaukee, and State of Wisconsin, have invented new and useful Improvements in Carbureters, of which the following is a specification.

My invention relates to improvements in that class of carbureters which is adapted to be used in connection with the cylinder of a gas engine.

The construction of my device is explained by reference to the accompanying drawings, in which—

Figure 1 represents a vertical section thereof, and Fig. 2 a rear view, part in section.

Like parts are identified by the same reference characters in both views.

1 represents the valve chamber of my apparatus.

2 is the inlet air duct, 3 the exhaust duct which is adapted to be connected with the cylinder of an engine.

5 is an inlet duct which is adapted to be connected with the gasolene tank or other liquid fuel supply and through which the gasolene is adapted to be admitted to the carbureter with each stroke of the engine, with which the exhaust duct 3 is connected. The inlet air duct 2 is provided with a valve 6 which is pivotally supported from the valve chamber 1 of the carbureter upon the pin 7 and is adapted to be normally retained in the closed position shown, by the spring actuated arm 8. The arm 8 is pivotally supported from the chamber 1 upon the bolt 9 and bears at its opposite end upon the angular lug 10. The angular lug 10 is formed integrally with the valve 6.

11 is an actuating spring from which motion is communicated through the arm 8 to the valve 6 through the shoulder 10 as stated. The spring 11 is connected at one end with the arm supporting bolt 9 and at its opposite end with the walls of the chamber, and it is so wound that it is adapted by its recoil to turn the bolt 9 from left to right thereby throwing the free end of the arm 8, which is rigidly connected with said bolt 9 downward against said lug 10, whereby said valve 6 is normally retained in the closed position shown. It will be understood that with each forward stroke of the piston of the engine the air will be caused to rush in through the duct 2, whereby said valve 6 will be moved to the open position indicated by dotted lines. When, however, the piston has reached the limit of its forward movement, the valve 6 will be closed by the recoil of said spring 11.

12 represents a valve by which the admission of gasolene or other liquid is controlled. The valve 12 has its seat upon the inner end of the duct 5 and is provided with a protruding stem 13. The stem 13 extends through an aperture in the arm 8 and is provided with a nut 14 which is adapted to contact with the upper side of said arm 8 as said arm is raised, and a nut 15 which is adapted to contact with the lower side of said arm 8 as the latter is lowered, thereby forcing said valve 12 to its seat. It will now be understood that as the valve 6 is moved inward by the incoming atmosphere with each forward stroke of the engine, motion will be communicated therefrom through the lug 10 and arm 8 to said valve 12, whereby said valve will be opened and permit a small quantity of gasolene or other liquid fuel to simultaneously enter the carbureter. When, however, said valve 6 is closed said valve 12 will also be moved in the opposite direction and closed.

16 is a guide bearing for the upper end of the valve rod 13 whereby said valve 12 is guided to and from its seat.

17 is a screen which serves to retard the escape of the unvaporized fuel. The guide bearing 16 and screen 17 are supported upon the radial arms 18, and said radial arms 18 are in turn supported from the walls of the outlet duct 3 substantially as shown.

19 is a damper which is pivotally supported in the outlet duct 3 upon a shaft 20, and said shaft 20 is supported at its respective ends in the walls of said outlet duct. 21 is an arm by which said damper 19 is opened and closed and the escape of gas thereby regulated and controlled.

22 is a handle by which the valve 12 may be raised by the manual act of a person, whereby a small quantity of gasolene or other liquid fuel may be admitted into the carbureter, preparatory to starting the engine. Motion is communicated from the handle 22 to the valve 12 through the shaft 9 and arm 8. It will be understood that after the liquid fuel has been thus admitted and the engine started in the ordinary way, the fluid controlling valve will be automatically moved, whereby the liquid fuel will thereafter be automatically supplied as hereinbefore described.

While I have described my apparatus as being adapted to be used with gasolene or other liquid fuel, it is obvious that the same may, if desired, be operated in substantially the same manner with ordinary illuminating or fuel gas, when the required quantity of air to produce combustion will be admitted as stated through said inlet duct 2.

To prevent the liability of sediment accumulating upon the seat of the fuel controlling valve 12, I preferably provide the upper end of the valve stem with a rigidly affixed fan or bladed wheel 25, which is adapted to be turned by the current of escaping gas through the outlet duct whereby said valve 12 is rotated and such foreign substances as might otherwise accumulate on the seat of the valve will be removed.

It will be understood that the quantity of fuel admitted with each stroke of the engine will depend upon the height that the valve 12 is raised from its seat. It therefore follows that when the damper 19 is partially closed it will throttle the escaping gas, and consequently limit the movement of the inlet air valve 6, whereby the stroke of the lever 8 and the fluid controlling valve 13 will also be proportionately limited whereby the quantity of fuel admitted with each stroke of the engine will correspond with the quantity of air admitted.

Having thus described my invention what I claim as new and desire to secure by Letters Patent is,—

1. In a carbureter of the class described, the combination of a valve chamber provided with an inlet air duct, an air controlling valve pivotally supported in said duct, an outlet gas duct adapted to be connected with the cylinder of a gas engine, an inlet liquid duct, a liquid controlling valve located in said liquid duct, a spring actuated arm pivotally connected at one end with said chamber, centrally connected with said liquid controlling valve and connected at its opposite end with said air controlling valve, said arm being adapted to normally retain both the said air valve and liquid controlling valve in their closed positions, while motion is communicated from said inlet air valve as the same is opened through said spring actuated arm to said liquid controlling valve.

2. In a carbureter of the class described, the combination of a valve chamber provided with an inlet air duct, an air controlling valve pivotally supported in said duct, an outlet gas duct adapted to be connected with the cylinder of a gas engine, an inlet liquid duct, a liquid controlling valve located in said last named duct, an arm pivotally connected at one end with the walls of said chamber, centrally connected with said liquid controlling valve and at its opposite end with said air controlling valve, and means for manually actuating said arm from the exterior of said chamber.

3. In a carbureter of the class described, the combination of a valve chamber provided with an inlet air duct, an air controlling valve located in said duct, an outlet gas duct adapted to be connected with the cylinder of a gas engine, a screen and a damper located in said outlet gas duct, means for controlling said damper from the exterior of its inclosing duct, an inlet liquid duct, a liquid controlling valve located in said liquid duct, a valve actuating arm pivotally connected at one end with the wall of said chamber, centrally connected with said liquid duct and at its opposite end with said air controlling valve and means for manually actuating said arm from the exterior.

4. In a carbureter of the class described, the combination of a valve chamber provided with an inlet air duct, an air controlling valve located in said duct, an outlet gas duct adapted to be connected with the cylinder of a gas engine, an inlet liquid duct, a valve located in said liquid duct, a pivotal bolt centrally supported from the wall of said valve chamber, an operating handle connected with the protruding end of said bolt, an arm connected with the inner end of said bolt, said arm being adapted to bear at its free end upon an integral part of said inlet air controlling valve, a spring adapted to actuate said arm in one direction as the air controlling valve is closed, said arm being adapted to be moved in the opposite direction by said air controlling valve as the same is opened, means for communicating motion from said arm to said liquid controlling valve, and means connected with said arm for manually operating the same from the exterior of said valve chamber, all substantially as and for the purpose specified.

5. In a carbureter of the class described the combination of a valve chamber provided with an inlet air duct, an outlet gas duct adapted to be connected with the cylinder of a gas engine, an inlet fuel duct, a valve located in said fuel duct, a fan or bladed wheel affixed to the stem of said valve and adapted to rotate the valve on its seat as it is being raised, and means for communicating motion from said inlet air valve to said fluid controlling valve.

In testimony whereof I affix my signature in the presence of two witnesses.

ALBERT E. GUMZ.

Witnesses:
JAS. B. ERWIN,
O. R. ERWIN.